(12) United States Patent
Yamashita et al.

(10) Patent No.: US 10,520,015 B2
(45) Date of Patent: Dec. 31, 2019

(54) ROLLING BEARING AND ROTATING DEVICE INCLUDING ROLLING BEARING

(71) Applicant: JTEKT CORPORATION, Osaka-shi, Osaka (JP)

(72) Inventors: Daisuke Yamashita, Kashiba (JP); Yasuhiko Ishii, Kashiwara (JP); Takahiro Koyanagi, Hamamatsu (JP); Masahide Izumi, Kyoto (JP); Masayoshi Kouno, Kadoma (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/214,997

(22) Filed: Dec. 10, 2018

(65) Prior Publication Data
US 2019/0195275 A1    Jun. 27, 2019

(30) Foreign Application Priority Data

Dec. 25, 2017   (JP) .................................. 2017-247700

(51) Int. Cl.
| | |
|---|---|
| *F16C 19/04* | (2006.01) |
| *F16C 33/66* | (2006.01) |
| *F16C 19/16* | (2006.01) |
| *F16C 33/58* | (2006.01) |
| *F16C 35/04* | (2006.01) |
| *F16C 35/067* | (2006.01) |

(52) U.S. Cl.
CPC ............ *F16C 19/16* (2013.01); *F16C 33/585* (2013.01); *F16C 33/586* (2013.01); *F16C 35/042* (2013.01); *F16C 35/067* (2013.01); *F16C 2240/30* (2013.01); *F16C 2240/42* (2013.01)

(58) Field of Classification Search
CPC ...... F16C 19/16; F16C 33/585; F16C 33/586; F16C 35/063; F16C 35/067; F16C 35/07; F16C 35/073; F16C 35/077; F16C 2223/30; F16C 2223/40
See application file for complete search history.

(56) References Cited

U.S. PATENT DOCUMENTS

| | | | | |
|---|---|---|---|---|
| 3,294,459 A | * | 12/1966 | Howe, Jr. .............. | F16C 35/063 384/541 |
| 8,793,878 B2 | * | 8/2014 | Gegner ..................... | C21D 9/40 148/589 |
| 2014/0356639 A1 | * | 12/2014 | Gegner .................... | B05D 1/18 428/469 |
| 2017/0138404 A1 | | 5/2017 | Taniguchi et al. | |

FOREIGN PATENT DOCUMENTS

| | | | | |
|---|---|---|---|---|
| JP | 2012215288 A | * | 11/2012 | .............. F16C 19/26 |
| JP | 2017-089845 A | | 5/2017 | |

* cited by examiner

*Primary Examiner* — Phillip A Johnson
(74) *Attorney, Agent, or Firm* — Oliff PLC

(57) ABSTRACT

A rolling bearing includes: an inner ring; an outer ring; and a plurality of rolling elements provided between the inner ring and the outer ring, wherein: one of the inner ring and the outer ring is a rotating ring; the other one of the inner ring and the outer ring is a firm ring; the firm ring is attached to a prescribed member; and a black oxide film having a mesh-shaped crack is formed on at least one surface of a fitting surface of the firm ring and a side face of the firm ring, the fitting surface facing the prescribed member in a radial direction of the rolling bearing, the side face making contact with the prescribed member in an axial direction of the rolling bearing.

10 Claims, 7 Drawing Sheets

(SECOND SIDE IN AXIAL DIRECTION)   (FIRST SIDE IN AXIAL DIRECTION)

(SECOND SIDE IN AXIAL DIRECTION)  (FIRST SIDE IN AXIAL DIRECTION)

ROLLING BEARING AND ROTATING DEVICE INCLUDING ROLLING BEARING

INCORPORATION BY REFERENCE

The disclosure of Japanese Patent Application No. 2017-247700 filed on Dec. 25, 2017 including the specification, drawings and abstract is incorporated herein by reference in its entirety.

BACKGROUND

1. Technical Field

The disclosure relates to a rolling bearing and a rotating device including the rolling bearing.

2. Description of Related Art

A rolling bearing includes an inner ring, an outer ring, and a plurality of rolling elements provided between the inner ring and the outer ring. For example, in a case of a rolling bearing that supports a rotating shaft in a housing, an inner ring is attached to the rotating shaft in an outwardly engaged manner and an outer ring is attached to an inner peripheral surface of the housing. The inner ring and the rotating shaft are assembled in a "wringing fit" state, whereas the outer ring and the housing are assembled in a "clearance fit" state. In this case, in a using state where the rotating shaft rotates, creep (slip of the outer ring over the housing in the circumferential direction) may occur between the outer ring and the housing.

As the creep, there are three creeps as follows. Note that the following bearing rotation direction is a rotation direction of the inner ring that is a rotating ring.
First creep: creep in which the outer ring slips slowly in the same direction as the bearing rotation direction.
Second creep: creep in which the outer ring slips fast in the same direction as the bearing rotation direction.
Third creep: creep in which the outer ring slips in a reverse direction from the bearing rotation direction.

In order to restrain the first creep, a technique described in Japanese Unexamined Patent Application Publication No. 2017-89845 (JP 2017-89845 A) has been proposed. In a rolling bearing described in JP 2017-89845 A, an annular groove for creep restraint is formed on an outer peripheral surface of an outer ring serving as a fitting surface to a housing.

SUMMARY

With the rolling bearing described in JP 2017-89845 A, it is possible to restrain the first creep. The first creep may easily occur when a large load in the radial direction is applied to the rolling bearing.

The second creep occurs in the same rotation direction (slip direction) of the outer ring as the first creep, but easily occurs in a state where a load in the radial direction that is applied to the rolling bearing is zero or light. That is, in a case where the load is zero or light in the radial direction, it is considered that the outer ring follows the rotation of the inner ring, so that the second creep occurs.

The occurrence factor and the mechanism of occurrence of the second creep are totally different from those of the first creep. Accordingly, only the configuration described in JP 2017-89845 A cannot restrain the second creep. Note that, when creep occurs, such a problem occurs that an inner peripheral surface of the housing (a counterpart member) is worn.

The disclosure provides a rolling bearing and a rotating device including the rolling bearing each of which can restrain creep that easily occurs in a state where a load is zero or light in the radial direction.

An aspect of the disclosure relates to a rolling bearing including: an inner ring; an outer ring; and a plurality of rolling elements provided between the inner ring and the outer ring, wherein: one of the inner ring and the outer ring is a rotating ring; the other one of the inner ring and the outer ring is a firm ring; the firm ring is attached to a prescribed member; and a black oxide film having a mesh-shaped crack is formed on at least one surface of a fitting surface of the firm ring and a side face of the firm ring, the fitting surface facing the prescribed member in a radial direction of the rolling bearing, the side face making contact with the prescribed member in an axial direction of the rolling bearing.

In the rolling bearing, a black oxide film having a mesh-shaped crack on its surface makes contact with a prescribed member, in other words, a counterpart member. Since the static friction coefficient is increased by the crack, it is possible to restrain creep of the firm ring that easily occurs in a state where a load is zero or light in the radial direction. Further, even if creep occurs (even if creep due to other factors occurs), it is possible to restrain abrasion of the counterpart member because the black oxide film of the firm ring has a low dynamic friction coefficient.

In the above aspect, an occupancy of microgrooves on a surface where the black oxide film is formed may be equal to or larger than 5% and equal to or smaller than 20%, the occupancy being a ratio of an area of microgrooves formed on the black oxide film and constituting the cracks with respect to an area of the surface.

When the occupancy of the microgrooves on the surface of the black oxide film is 5% or more, a function to increase the static friction coefficient is improved.

Further, in the black oxide film, the static friction coefficient is high, but the dynamic friction coefficient is low. Hereby, as described above, it is possible to restrain creep of the firm ring that easily occurs in a state where a load is zero or light in the radial direction, and even if creep occurs (even if creep due to other factors occurs), it is possible to restrain abrasion of the counterpart member.

In the above aspect, a film thickness of the black oxide film may be larger than 1 micrometer and equal to or smaller than 3 micrometers.

With this configuration, the black oxide film that is a soft film as compared to a material (the firm ring) can prevent direct contact between the firm ring and the counterpart member, thereby making it possible to restrain aggression to the counterpart member, and further, the black oxide film is a thick film having a thickness larger than 1 micrometer as described above, so that durability of the black oxide film is improved.

In the above aspect, the fitting surface may have an annular groove; and the annular groove may have a depth at which a bottom portion of the annular groove does not make contact with the prescribed member when a load, which is equal to or smaller than a prescribed value, in the radial direction is applied.

With this configuration, creep that easily occurs when a large load in the radial direction is applied to the rolling bearing can be restrained.

In the above aspect, each of the rolling elements may be a ball; a peripheral surface on an opposite side of the firm ring from the fitting surface may have a raceway groove with which the ball makes rolling contact; and a contact surface formed when the ball makes contact with the raceway groove may be entirely positioned within a range in which the annular groove is formed, the range being a range in the axial direction of the firm ring.

When a load in the radial direction is applied to the rolling bearing, a large elastic deformation occurs on the fitting surface of the firm ring, at a position directed in the radial direction from a contact ellipse formed due to contact between the ball and the raceway groove formed on the opposite side from the fitting surface. With the above configuration, the annular groove for creep restraint is formed at a position where the elastic deformation is large. On this account, the firm ring elastically deforms in the annular groove, so that the elastic deformation is hardly transmitted to the counterpart member, thereby making it possible to further increase an effect to restrain creep that easily occurs when a large load in the radial direction is applied to the rolling bearing.

In the above aspect, a load in the radial direction of the rolling bearing and a load in the axial direction of the rolling bearing may be applied to the rolling bearing; the contact surface may have an elliptical shape; and a virtual line extending in the radial direction from a center of the contact surface may intersect with the bottom portion of the annular groove, the bottom portion being a deepest part of the annular groove.

In this case, a part of the firm ring where a large elastic deformation occurs can correspond to a deepest part of the annular groove. Hereby, the elastic deformation of the firm ring is further hardly transmitted to the counterpart member, so that it is possible to further increase an effect to restrain the creep of the firm ring.

In the above aspect, the annular groove may have the bottom portion and inclined portions; the bottom portion may have a maximum depth in the annular groove and has a cylindrical shape in which the depth is uniform along the axial direction; and the inclined portions may be placed on opposite sides of the bottom portion in the axial direction and are configured to shallow the depth of the annular groove toward opposite ends of the annular groove in the axial direction of the rolling bearing.

In this case, even if a load in the axial direction is applied to the rolling bearing, the virtual line extending in the radial direction from the center of the contact ellipse intersects with the deepest bottom portion of the annular groove for creep restraint, so that it is possible to further increase an effect to restrain the creep of the firm ring.

In the above aspect, the rotating ring may be attached to a rotating member that rotates such that the rotating ring rotates in an integrated manner with the rotating member; the prescribed member to which the firm ring is attached may not rotate.

Another aspect of the disclosure relates a rotating device comprising: a first member; a second member; and a rolling bearing including: an inner ring; an outer ring; and a plurality of rolling elements provided between the inner ring and the outer ring, wherein: one of the inner ring and the outer ring is a rotating ring; the other one of the inner ring and the outer ring is a firm ring; the rotating ring is attached to the first member; the firm ring is attached to the second member; and a black oxide film having a mesh-shaped crack is formed on at least one surface of a fitting surface of the firm ring and a side face of the firm ring, the fitting surface facing the second member in a radial direction of the rolling bearing, the side face making contact with the second member in an axial direction of the rolling bearing.

In the above aspect, the first member may rotate such that the rotating ring rotates in an integrated manner with the first member; and the second member may not rotate.

According to the present disclosure, it is possible to restrain creep of a firm ring that easily occurs in a state where a load is zero or light in the radial direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Overall Configuration of Rolling Bearing

Figure 1:
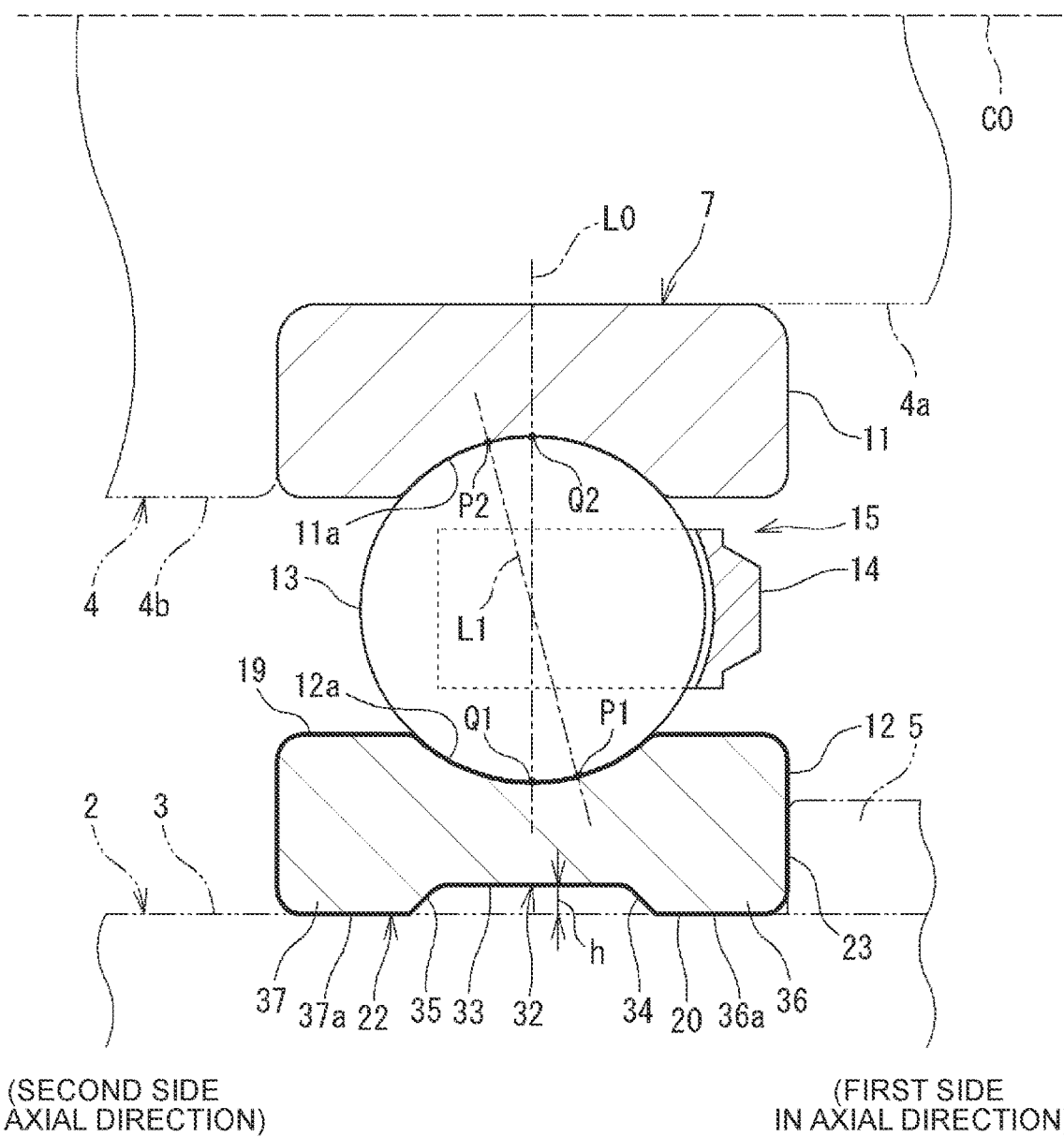
FIG. 1 is a sectional view illustrating one embodiment of a rolling bearing of the disclosure.

FIG. 1 is a sectional view illustrating an example of a rolling bearing of the disclosure. A rolling bearing 7 illustrated in FIG. 1 is provided in a rotating device including a housing 2 and a rotating shaft 4 and supports the rotating shaft 4 rotationally relative to the housing 2. The rotating shaft 4 includes a small-diameter shaft portion 4*a* to which the rolling bearing 7 is attached in an outwardly engaged manner, and a large-diameter shaft portion 4*b* having an outside diameter larger than that of the small-diameter shaft portion 4*a*. An inner ring 11 of the rolling bearing 7 makes contact with the large-diameter shaft portion 4*b* from the axial direction. An annular portion 5 is provided on a first side, in the axial direction, of an inner peripheral surface 3 (hereinafter also referred to as a housing inner peripheral surface 3) of the housing 2. An outer ring 12 of the rolling bearing 7 makes contact with the annular portion 5 from the axial direction.

The rolling bearing 7 includes the inner ring 11 attached to the rotating shaft 4 in an outwardly engaged manner, the outer ring 12 attached to the housing inner peripheral surface 3, a plurality of balls (rolling elements) 13 provided between the inner ring 11 and the outer ring 12, and an annular cage 14 that holds the balls 13. The rolling bearing 7 illustrated in FIG. 1 is a deep groove ball bearing.

When the rolling bearing 7 supports the rotating shaft 4, a load in the radial direction is applied to the rolling bearing 7. Further, depending on an operating state of the rotating device, the load in the radial direction may become zero (no-load) or light (light-load). The annular portion 5, the rolling bearing 7, and the rotating shaft 4 are provided such that the annular portion 5 of the housing 2 presses the outer ring 12 from the first side in the axial direction to a second side in the axial direction, and the large-diameter shaft portion 4b of the rotating shaft 4 presses the inner ring 11 from the second side in the axial direction to the first side in the axial direction. That is, a load in the axial direction may be also applied to the rolling bearing 7. Based on the foregoing, in the case of the rolling bearing 7 illustrated in FIG. 1, a combined load of the load in the radial direction and the load in the axial direction may be applied thereto. Note that, as another example of the disclosure, the rolling bearing 7 may be configured such that the load in the axial direction is not applied thereto, and only the load in the radial direction is applied thereto.

The inner ring 11 and the rotating shaft 4 are assembled in a "wringing fit" state, and the inner ring 11 is fitted to the rotating shaft 4 in a closely contact manner and can rotate in an integrated manner with the rotating shaft 4. In contrast, the outer ring 12 is attached to the housing 2 that is in a fixed state, such that the outer ring 12 is attached to the housing inner peripheral surface 3 in a "clearance fit" state. The "clearance fit" state here means that the outer ring 12 and the housing inner peripheral surface 3 are fitted to each other in a state in which a clearance is provided between the outer ring 12 and the housing inner peripheral surface 3. On this account, in a state where the rotating shaft 4 rotates together with the inner ring 11, creep (slip of the outer ring 12 over the housing 2 in the circumferential direction) may occur between the outer ring 12 and the housing 2. Note that the creep will be described later.

An inner ring raceway groove (raceway surface) 11a on which the ball 13 rolls is formed on an outer peripheral surface of the inner ring 11, and an outer ring raceway groove (raceway surface) 12a on which the ball 13 rolls is formed on an inner peripheral surface of the outer ring 12. The balls 13 are provided in an annular space 15 between the inner ring 11 and the outer ring 12, and when the rolling bearing 7 rotates (when the inner ring 11 rotates), the balls 13 roll on the inner ring raceway groove 11a and the outer ring raceway groove 12a in a state where the balls 13 are held by the cage 14.

As illustrated in FIG. 1, respective sectional shapes of the inner ring raceway groove 11a and the outer ring raceway groove 12a are an arcuate shape having a curvature diameter that is slightly larger than the radius of the ball 13. On this account, when a load (the combined load) is applied to the rolling bearing 7, elliptical contact surfaces are formed between the ball 13 and the inner ring raceway groove 11a and between the ball 13 and the outer ring raceway groove 12a. The elliptical contact surfaces are hereinafter referred to as contact ellipses.

The inner ring 11, the outer ring 12, and the ball 13 are made of carbon steel and bearing steel is used in the present embodiment. The rotating shaft 4 is made of carbon steel and the housing 2 is made of aluminum alloy (metal).

The cage 14 can hold the balls 13 at intervals (at regular intervals) along the circumferential direction, and for this purpose, a plurality of pockets is formed in the cage 14 along the circumferential direction so that the balls 13 are accommodated therein. The cage 14 of the present embodiment is made of resin.

In the rolling bearing 7 of the present embodiment, the outer ring 12 as a firm ring is attached to the housing 2 (a counterpart member) and an outer peripheral surface of the outer ring 12 serves as a fitting surface 22 to the housing 2 (the inner peripheral surface 3). A black oxide film 20 (also referred to as a triiron tetroxide film) is formed on the fitting surface 22. Note that the black oxide film 20 should be formed on either one of the fitting surface 22 and a side face 23, of the outer ring 12, that makes contact with the housing 2 (the counterpart member). Further, in the present embodiment, an annular groove 32 is formed on the fitting surface 22. In the present embodiment, when a prescribed process (black oxide coating) is performed on the outer ring 12 where the annular groove 32 is formed, the black oxide film 20 is formed on the whole surface of the outer ring 12. Details of the black oxide film 20 and the annular groove 32 will be described later.

Creep

Here, creep occurring between the housing 2 and the outer ring 12 will be described. The following three creeps are considered as creep that may occur in the rolling bearing 7. Note that, in the present embodiment, the following bearing rotation direction is a rotation direction of the inner ring 11 that is a rotating ring.

First creep: creep in which the outer ring 12 slips slowly in the same direction as the bearing rotation direction.

Second creep: creep in which the outer ring 12 slips fast in the same direction as the bearing rotation direction.

Third creep: creep in which the outer ring 12 slips in a reverse direction from the bearing rotation direction.

The first creep easily occurs when a large load including a component in the radial direction is applied to the rolling bearing 7, and it is considered that the first creep occurs due to the following mechanism. That is, in a case where a large load including a component in the radial direction is applied to the rolling bearing 7, the ball 13 receives a heavy load and passes through the outer ring raceway groove 12a, and at this time, an outer peripheral side of the outer ring right below the ball 13 partially elastically deforms. Note that, in the case of the rolling bearing 7 illustrated in FIG. 1, a load in the axial direction is also applied in addition to the large load in the radial direction, and when the combined load in a direction of a straight line L1 is applied, the outer ring 12 elastically deforms such that a strain amount becomes large in a radially outer part at a point P1. The straight line L1 is a straight line connecting the point P1 and a point P2 that are contact points of the ball 13 with respect to the outer ring 12 and the inner ring 11. Since the ball 13 moves along the outer ring raceway groove 12a, the outer ring 12 deforms in a pulsatile manner (in other words, is displaced in a pulsatile manner). Hereby, in a case where the annular groove 32 is not formed, it is considered that a relative slide occurs in a contact region between the housing 2 and the outer ring 12 due to elastic deformation (pulsatile displacement) of the outer ring 12, and the relative slide causes the first creep. The first creep is also called "strain creep."

The second creep occurs in the same moving direction (slip direction) of the outer ring 12 as the first creep, but easily occurs in a state where a load applied to the rolling bearing 7 is zero or light. That is, in a case where the load is zero or light, it is considered that the outer ring 12 is rotated following the rotation of the inner ring 11, so that the second creep occurs. The second creep is also called "dragging creep."

The third creep occurs in a reverse moving direction (slip direction) of the outer ring 12 from the first creep and the second creep, and it is considered that the third creep occurs such that a load in the radial direction becomes an offset load, for example, so that the outer ring 12 whirls along the housing inner peripheral surface 3.

Black Oxide Film 20

Figure 2:
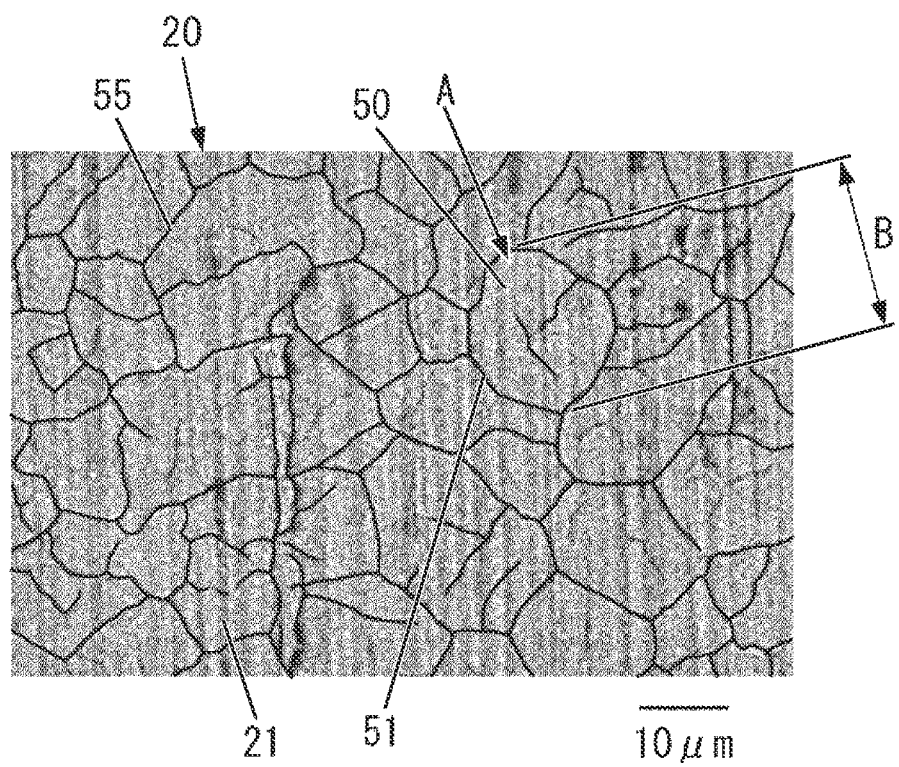
FIG. 2 is a view illustrating a macrophotograph of a surface of a black oxide film formed on a fitting surface of an outer ring.

FIG. 2 is a view illustrating a macrophotograph of a surface 21 of the black oxide film 20 formed on the fitting surface 22 of the outer ring 12. As illustrated in FIG. 2, the black oxide film 20 of the present embodiment has a mesh-shaped crack 55 on the surface 21. That is, a lot of microgrooves 51 are formed on the black oxide film 20 so that the microgrooves 51 are partially connected to each other, and the mesh-shaped crack 55 is constituted by the microgrooves 51. As illustrated in FIG. 2, the crack 55 has a pattern looks like tortoise shell.

For example, as indicated by an arrow A in FIG. 2, a dimension (maximum value) B of one flat portion 50 surrounded by the microgrooves 51 is around 10 micrometers. It is preferable that the dimension (maximum value) B of the flat portion 50 be not less than 5 micrometers but not more than 20 micrometers. Note that, when a range of a square of 100 micrometers in height and 100 micrometers in width on the surface 21 of the black oxide film 20 is regarded a "unit area," the dimension B is an average value of the flat portions 50 included in the unit area.

Figure 3:
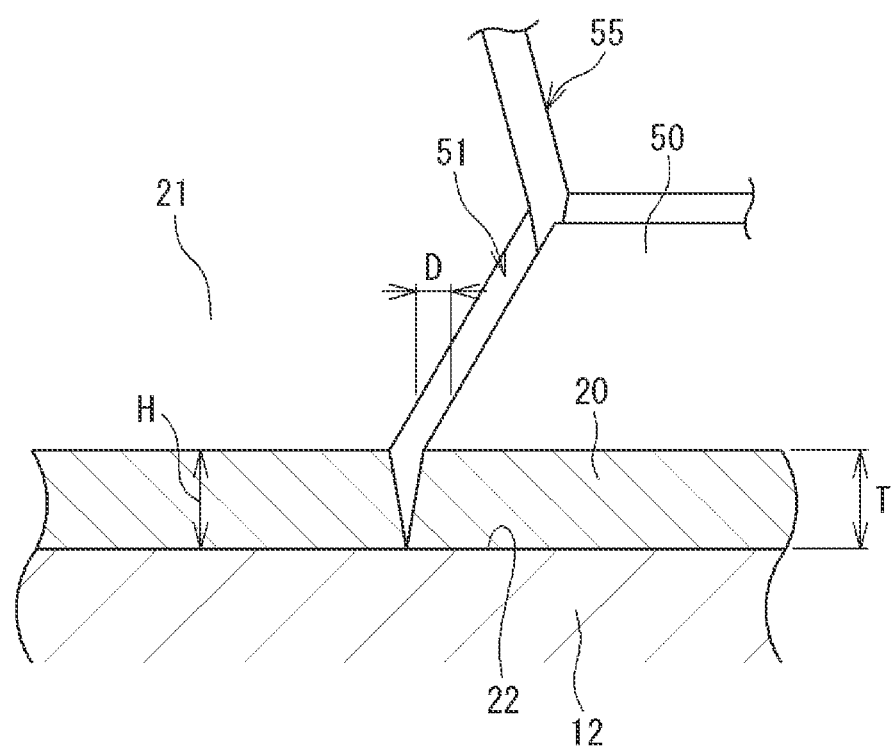
FIG. 3 is a conceptual drawing illustrating the black oxide film formed on the fitting surface of the outer ring.

FIG. 3 is a conceptual drawing illustrating the black oxide film 20 formed on the fitting surface 22 of the outer ring 12. A film thickness T of the black oxide film 20 is thicker than that in the related art. More specifically, the film thickness T (average value) of the black oxide film 20 is larger than 1 micrometer but not larger than 3 micrometers. In the configuration illustrated in FIG. 2, the film thickness T (average value) is larger than 2 micrometers but not larger than 3 micrometers.

In FIG. 3, it is preferable that a width (an average value) D of the microgroove 51 be not less than 0.1 micrometers but not more than 0.3 micrometers. Further, a depth (an average value) H of the microgroove 51 is the same as the thickness (the film thickness T) of the black oxide film 20. That is, the crack 55 (the microgrooves 51) is formed over the whole length of the black oxide film 20 in the thickness direction. That is, the black oxide film 20 is configured such that one flat portion 50 is discontinuous from its adjacent flat portion 50 due to the crack 55.

The black oxide film 20 should have the mesh-shaped crack 55 at least on the surface 21, but in the present embodiment, the mesh-shaped crack 55 having a depth from the surface 21 of the black oxide film 20 to the outer peripheral surface (the fitting surface 22) of the outer ring 12 is formed. As the values of the width D and the depth H of the microgroove 51 are larger, a function to restrain the second creep (dragging creep) becomes higher, as will be described later.

The occupancy, on the surface 21, of the microgrooves 51 formed on the black oxide film 20 and constituting the crack 55 is 5% or more and is preferably 20% or less. Note that the occupancy is an occupancy in the unit area. That is, in a case where the macrophotograph of the surface 21 of the black oxide film 20 is binarized (illustrated in black and white) (e.g., parts corresponding to the microgrooves 51 (the crack 55) are illustrated in black and other flat portions 50 are illustrated in white), the occupancy is obtained in accordance with Equation (1) as follows.

$$\text{(Area of Microgrooves 51 in Unit Area)/(Unit Area)} \times 100\% \quad (1)$$

When the occupancy of the microgrooves 51 is 5% or more, a function to increase the static friction coefficient of the black oxide film 20 is improved.

The static friction coefficient (average value) of the black oxide film 20 of the present embodiment is not less than 0.3 but not more than 0.4. According to the measurement described below, the static friction coefficient of the black oxide film 20 of the present embodiment is 0.35. Note that, in a case where no process is performed (the black oxide film 20 is not formed), the static friction coefficient is around 0.23.

A measured value of the static friction coefficient is a value measured by a static friction coefficient measuring machine (HEIDON-10) made by Shinto Scientific Co., Ltd. The measurement condition is as follows: the lifting speed is 10 degrees/6 seconds as an average; the weight of a flat indenter (JIS P 8147 of Japanese Industrial Standards) is 200 g and the size thereof is 75×35 millimeters (contact surface); and the environmental temperature is an ordinary temperature (20 degrees). A test piece for evaluation is SPCC (a type of a cold rolled steel sheet or a steel tape as prescribed in the Japanese Industrial Standards), and the black oxide film 20 is formed on the test piece.

In the black oxide film 20 of the present embodiment, the static friction coefficient is increased by the crack 55, but the dynamic friction coefficient is low as the whole surface 21. The dynamic friction coefficient (average value) of the black oxide film 20 is not less than 0.075 but not more than 0.125. Due to the dynamic friction coefficient in this range, sliding performance is particularly high. Note that, in a case where no process is performed (the black oxide film 20 is not formed), the upper limit of the dynamic friction coefficient is around 0.2 to 0.25.

The measured value of the dynamic friction coefficient is a value measured by a Falex test. The measurement condition is as follows: the load increase speed is 20.04 kgf/sec; the rotation number is 290 rpm; the sliding environmental oil is CVTF; and the environmental temperature is an ordinary temperature (20 degrees). A test piece for evaluation is configured such that a pin side and a block side are both made of SCM415H (a type of steel as prescribed in the Japanese Industrial Standards), and the black oxide film 20 is formed on both of them.

As described above, in the rolling bearing 7 of the present embodiment, the black oxide film 20 having the mesh-shaped crack 55 on the surface 21 is formed on the fitting surface 22 of the housing 2 to which the outer ring 12 is attached. In the rolling bearing 7, the black oxide film 20 having the mesh-shaped crack 55 on the surface 21 makes contact with the housing 2. Since the static friction coefficient is increased by the crack 55 as described above, it is possible to restrain the second creep (dragging creep) of the outer ring 12 that easily occurs in a state where a load is zero or light in the radial direction. Further, even if creep occurs (even if creep due to other factors occurs), it is possible to restrain abrasion of the housing 2 because the black oxide film 20 of the outer ring 12 has a low dynamic friction coefficient.

Further, as described in FIG. 3, the film thickness T (average value) of the black oxide film 20 in the present embodiment is larger than 1 micrometer but not larger than 3 micrometers. Thus, the black oxide film 20 is thicker than that in the related art. The black oxide film 20 that is a soft film as compared to a material (the outer ring 12) can prevent direct contact between metals (the outer ring 12 and the housing 2), thereby making it possible to restrain aggression to the housing 2. Further, the black oxide film 20 is a thick film with the film thickness T that is larger than 1 micrometer, so that durability of the black oxide film 20 is improved.

As described above, in the black oxide film 20 of the present embodiment, the static friction coefficient is high and the dynamic friction coefficient is low (in comparison with the case where the black oxide film 20 is not formed). Hereby, the second creep (dragging creep) is restrained, and even if creep occurs (even if creep due to other factors occurs), it is possible to restrain abrasion of the housing 2.

In the present embodiment, the black oxide film 20 is also formed on the side face 23 (see FIG. 1) in the axial direction as well as the fitting surface 22. The side face 23 makes contact with the annular portion 5 serving as a part of the housing 2. On this account, the second creep is also restrained by the black oxide film 20 on the side face 23.

The black oxide film 20 of the present embodiment has a high adhesion to the surface of the outer ring 12, and also has a small dimensional change. This is because the surface layer of the outer ring 12 is a magnetite assembly. That is, in a film forming process, material elimination and magnetite generation (volume increase) occur. As such, the surface layer (iron surface layer) of the outer ring 12 is changed into the magnetite assembly, so that the black oxide film 20 of the present embodiment becomes a film having a high adhesion and a small dimensional change.

The black oxide film 20 as described above is formed by the following method. That is, the outer ring 12 is soaked in a sodium hydroxide solution so that the black oxide film 20 is formed on the surface of the outer ring 12 (black oxide coating). The temperature of the sodium hydroxide solution is around 150 degrees. The concentration of the sodium hydroxide solution is adjusted by a material and the like of the outer ring 12. Further, in a step of soaking a material (the outer ring 12) in the sodium hydroxide solution, the crack 55 can be formed by use of a difference in linear expansion coefficient between the material (the outer ring 12) and the film (the black oxide film 20), and further, the figure (the width D of the microgroove 51, the depth H of the microgroove 51) of the crack 55 can be adjusted.

Annular Groove 32

The following describes the annular groove 32 for restraining the first creep (strain creep). In FIG. 1, the annular groove 32 is constituted by an annular recessed groove continuous in the circumferential direction, and the sectional shape thereof is the same without changing along the circumferential direction. In the present embodiment, the annular groove 32 is provided in the central region, in the axial direction, of the fitting surface 22. The annular groove 32 has a depth (h) at which a bottom portion 33 of the annular groove 32 cannot make contact with the housing 2 (the inner peripheral surface 3) at the time when a static load rating in the radial direction is applied to the rolling bearing 7. In the case of the rolling bearing 7 illustrated in FIG. 1, a combined load of a load in the radial direction and a load in the axial direction is applied thereto. In a case where a radial component of the combined load is the static load rating, the bottom portion 33 of the annular groove 32 cannot make contact with the housing 2 (the inner peripheral surface 3). Note that, in FIG. 1 and so on illustrating the annular groove 32, the annular groove 32 is illustrated to have a deep depth for easy description of its shape, but an actual depth of the annular groove 32 is extremely smaller than the thickness of the outer ring 12 and the depth of the annular groove 32 is less than 1 mm, for example.

The outer ring 12 has cylindrical portions 36, 37 on the opposite sides of the annular groove 32 in the axial direction. Outer peripheral surfaces of the cylindrical portions 36, 37 are constituted by cylindrical surfaces around a bearing center line CO of the rolling bearing 7, and in the following description, the outer peripheral surfaces of the cylindrical portions 36, 37 are referred to as cylindrical surfaces 36a, 37a. As illustrated in FIG. 1, on a section including the bearing center line CO, the cylindrical surfaces 36a, 37a have a linear shape parallel to the bearing center line CO.

The cylindrical surfaces 36a, 37a are surfaces that can make contact with the housing 2 (the inner peripheral surface 3) via the black oxide film 20.

As described above, a load in the axial direction is applied to the rolling bearing 7. On this account, the ball 13 makes contact with the outer ring 12 at the point P1 on a side closer to the first side in the axial direction than a deepest point Q1 in the outer ring raceway groove 12a, and the ball 13 also makes contact with the inner ring 11 at the point P2 on a side closer to the second side in the axial direction than a deepest point Q2 in the inner ring raceway groove 11a. On the section illustrated in FIG. 1, the straight line L1 connecting the point P1 and the point P2 that are contact points of the ball 13 with respect to the outer ring 12 and the inner ring 11 is inclined from a center line L0 extending in the radial direction through the center of the ball 13. That is, the combined load of the load in the radial direction and the load in the axial direction is applied to the rolling bearing 7, and a direction where the ball 13 is brought into contact with the outer ring 12 and the inner ring 11 by the combined load is along the direction of the straight line L1 inclined from the center line L0, so that the rolling bearing 7 has a contact angle.

In order to restrain the first creep, the annular groove 32 is formed radially outwardly from the outer ring raceway groove 12a, on the fitting surface 22 of the outer ring 12. This makes it possible to restrain occurrence of a relative slide caused due to elastic deformation described in the mechanism of occurrence of the first creep, thereby making it possible to restrain the first creep. That is, in a case where a large load (combined load) including a component in the radial direction is applied to the rolling bearing 7, a region, of the outer ring 12, placed radially outwardly from the point P1 of the outer ring raceway groove 12a elastically deforms (increases in diameter) radially outwardly. However, since the annular groove 32 is formed in that region, the elastic deformation (diameter increase) can be mainly caused within the range of the annular groove 32. On this account, it is possible to reduce a range where an elastically deformed part makes direct contact with the housing inner peripheral surface 3, and thus, the elastic deformation does not reach (or hardly reaches) the housing 2, so that the occurrence of the first creep between the outer ring 12 and the housing 2 is restrained. As described above, the annular groove 32 serves as a groove (clearance groove) for restraining the first creep.

Figure 4:
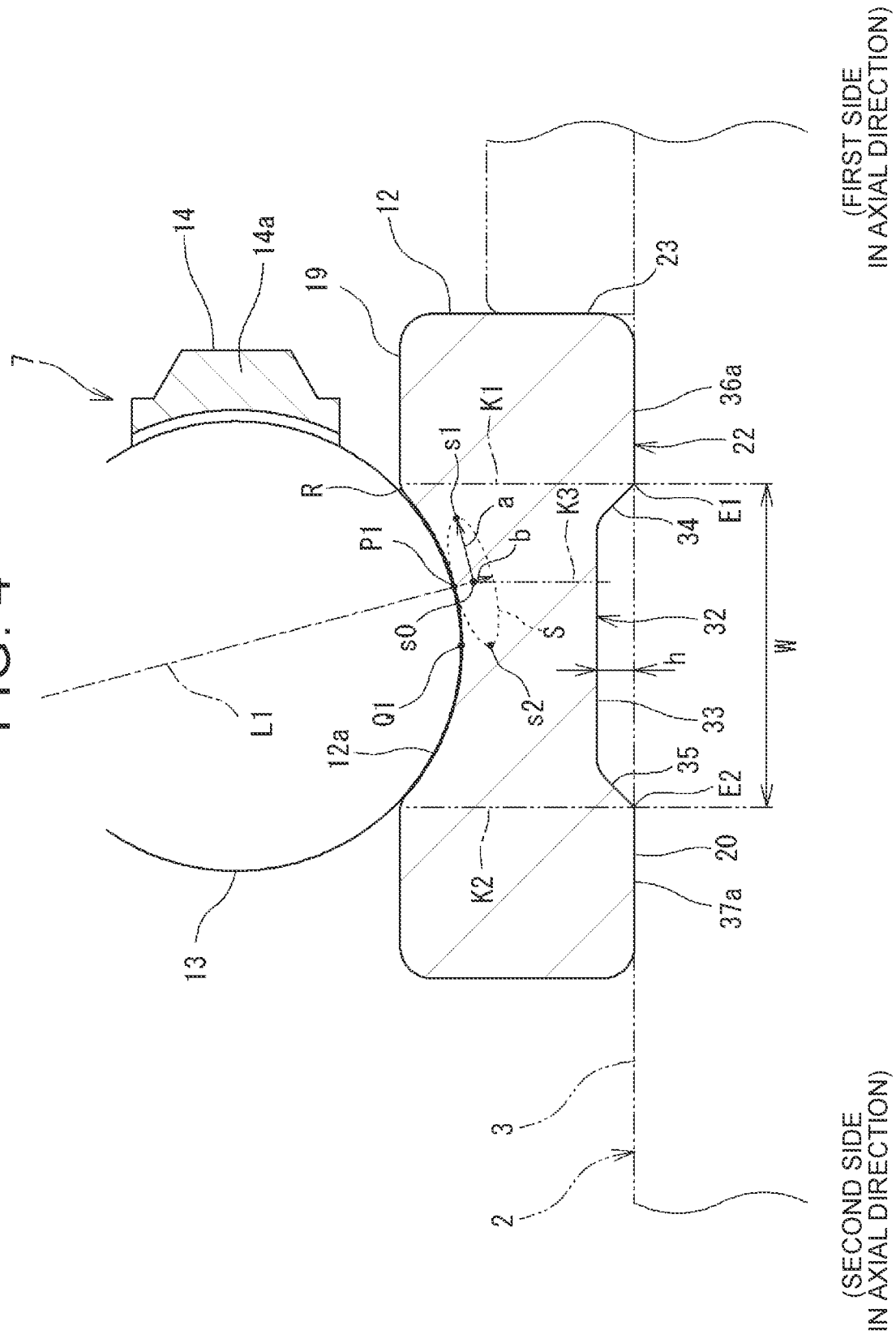
FIG. 4 is a sectional view of a ball, the outer ring, and a housing.

FIG. 4 is a sectional view of the ball 13, the outer ring 12, and the housing 2. The annular groove 32 has the cylindrical bottom portion 33, and inclined portions 34, 35 placed on the opposite sides of the bottom portion 33 in the axial direction. The bottom portion 33 is constituted by a cylindrical surface around the bearing center line CO (see FIG. 1), and the inclined portions 34, 35 are each constituted by a tapered surface. Further, the bottom portion 33 is a part where a groove depth h is largest in the annular groove 32 and the groove depth h is uniform along the axial direction. The inclined portion 34 (35) is a part where the groove depth becomes shallower toward a groove end E1 (E2). An intersecting point between the inclined portion 34 on the first side in the axial direction and the cylindrical surface 36a is the groove end E1 of the annular groove 32 on the first side in the axial direction, and an intersecting point between the inclined portion 35 on the second side in the axial direction and the cylindrical surface 37a is the groove end E2 of the annular groove 32 on the second side in the axial direction. That is, the annular groove 32 can range from the groove end E1 to the groove end E2. An axial range of the outer ring 12 where the annular groove 32 is formed is a range indicated by an arrow W in FIG. 4. In the outer ring 12, the axial range W is a range between a first virtual surface K1 perpendicular to the bearing center line CO (see FIG. 1) and passing through the groove end (intersecting point) E1 and a second virtual surface K2 perpendicular to the bearing center line CO (see FIG. 1) and passing through the groove end (intersecting point) E2.

Figure 5:
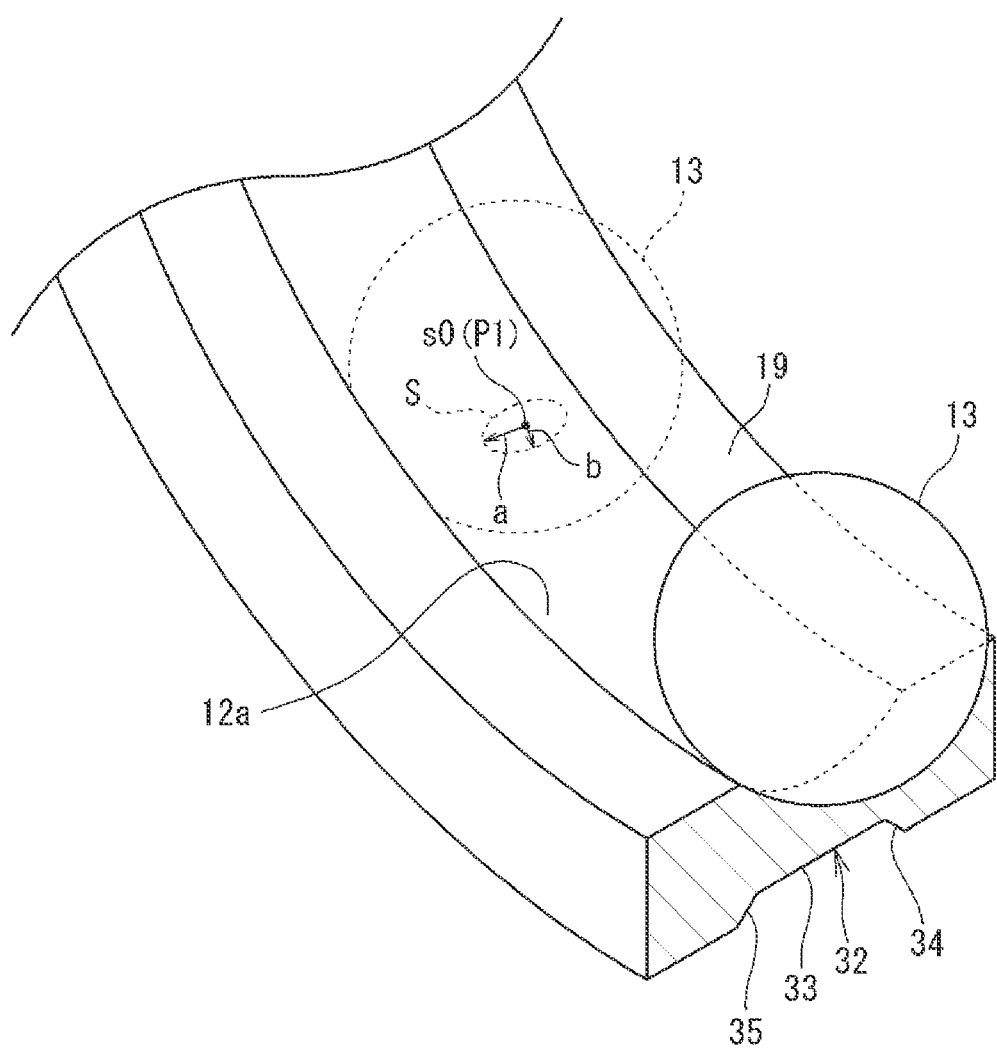
FIG. 5 is a perspective view of the ball and the outer ring.

As described above, the combined load of the load in the axial direction and the load in the radial direction is applied to the rolling bearing 7, so that the ball 13 and the outer ring raceway groove 12a make contact with each other at the point P1 with an elliptical contact surface. In FIG. 4, the elliptical shape (a contact ellipse S) by this contact is indicated by a broken line. Note that the contact ellipse S is actually formed along a recessed surface of the outer ring raceway groove 12a, but in FIG. 4, the contact ellipse S is artificially illustrated within a section of the outer ring 12 for description. That is, in FIG. 4, the point P1 and a center s0 of the contact ellipse S are not placed at the same position, but actually, as illustrated in FIG. 5, the point P1 and the center s0 are placed at the same position and the contact ellipse S is formed between the ball 13 and the outer ring raceway groove 12a. Further, the short axis of the contact ellipse S on the recessed surface of the outer ring raceway groove 12a is parallel to the circumferential direction, and the long axis of the contact ellipse S is along a direction perpendicular to the circumferential direction.

The shape (a semi-major axis a and a semi-minor axis b) of the contact ellipse S is found from Equation by the theory of Hertz. The shape of the contact ellipse S is found based on the shapes and characteristics of the outer ring raceway groove 12a and the ball 13, and a load (contact load) in a direction along the straight line L1 (see FIG. 2), applied between the outer ring raceway groove 12a and the ball 13, is assumed a basic static load rating of the rolling bearing 7.

As illustrated in FIG. 4, the whole contact ellipse S is placed within the axial range W of the outer ring 12. That is, an end s1 of the contact ellipse S on the first side in the axial direction is placed on a side closer to the second side in the axial direction than the groove end E1 (the virtual surface K1), and an end s2 of the contact ellipse S on the second side in the axial direction is placed on a side closer to the first side in the axial direction than the groove end E2 (the virtual surface K2).

Figure 6:
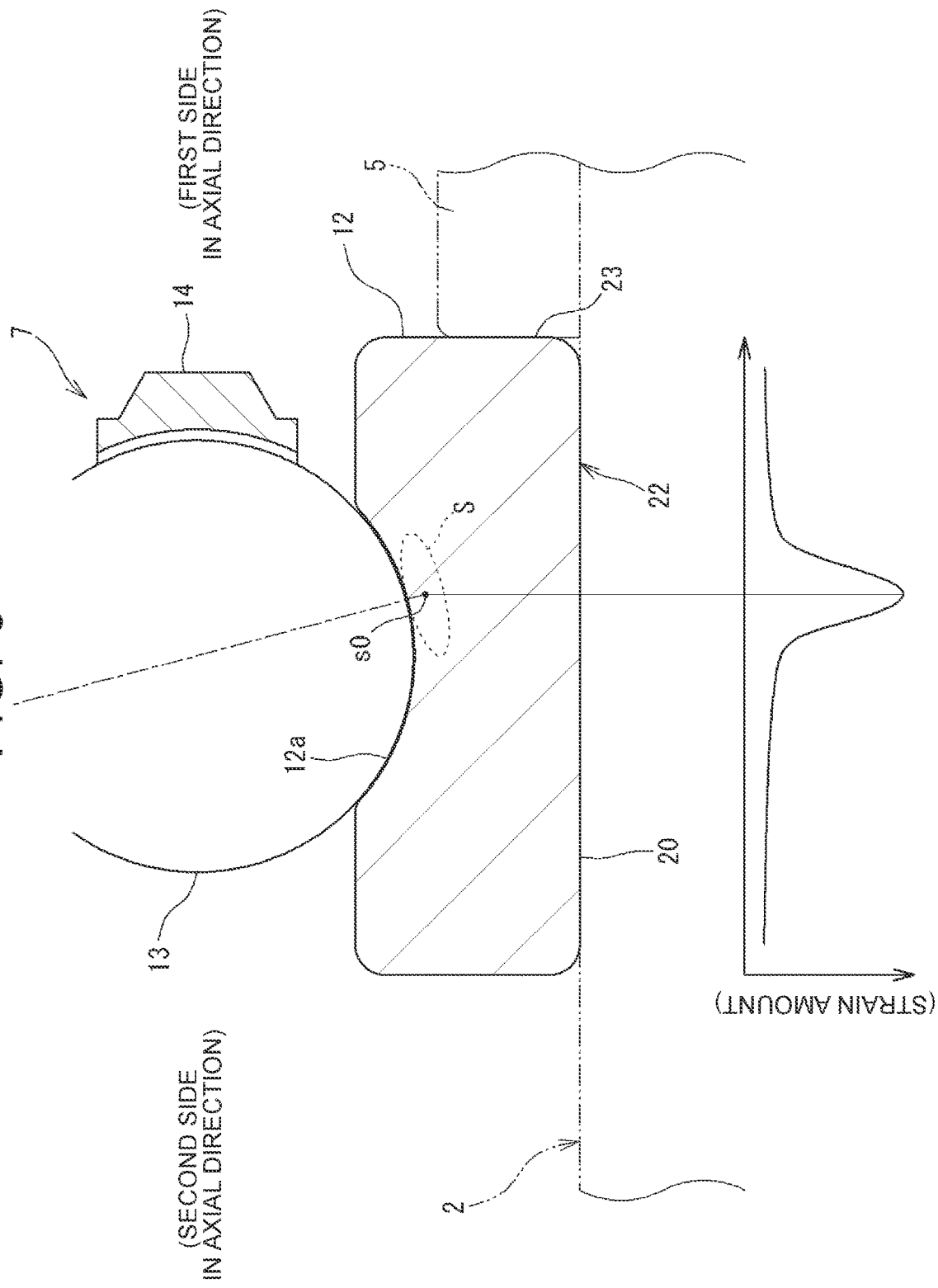
FIG. 6 is an explanatory view illustrating a rolling bearing configured such that an annular groove is not formed on an outer ring.

Here, FIG. 6 is an explanatory view illustrating the rolling bearing 7 configured such that the annular groove is not formed in the outer ring 12. The rolling bearing 7 illustrated in FIG. 6 is different from the rolling bearing 7 illustrated in FIG. 1 in that the annular groove 32 is not formed, but the other configurations are the same as those of the rolling bearing 7 in FIG. 1. In the configuration illustrated in FIG. 6, an elliptical contact surface (the contact ellipse S) is formed between the ball 13 and the outer ring raceway groove 12a when a combined load is applied. Due to the combined load, the outer ring 12 partially elastically deforms in a direction in which the diameter is increased, but its strain amount is larger on a radially outer side of the contact ellipse S as illustrated in a graph on the lower side of FIG. 6. Particularly, the strain amount of the outer ring 12 is largest on the radially outer side of the center s0 of the contact ellipse S. The elastic deformation is transmitted to the housing 2, so that the ball 13 makes rolling contact with the outer ring raceway groove 12a, thereby resulting in that the first creep may occur.

In view of this, in order to restrain the first creep, the whole contact ellipse S formed when the ball 13 makes contact with the outer ring raceway groove 12a is positioned within the axial range W, as illustrated in FIG. 4. As described above, when a large load including a component in the radial direction is applied to the rolling bearing 7, a large elastic deformation occurs on the fitting surface 22 of the outer ring 12, at a position directed radially outwardly from the contact ellipse S and its strain amount is maximum. However, in the aforementioned configuration, the annular groove 32 for creep restraint is formed at a position where the strain amount is largest. On this account, the outer ring 12 elastically deforms in the annular groove 32, so that the elastic deformation is hardly transmitted to the housing 2, so that it is possible to further increase an effect to restrain the first creep of the outer ring 12.

Further, in the present embodiment, a virtual line K3 extending radially outwardly from the center s0 of the contact ellipse S intersects with the deepest bottom portion 33 of the annular groove 32. On the fitting surface 22 of the outer ring 12, strain caused by the elastic deformation is largest right below the center s0 of the contact ellipse S. Accordingly, by placing the deepest bottom portion 33 of the annular groove 32 at such a position, the elastic deformation of the outer ring 12 is hardly transmitted to the housing 2.

As illustrated in FIG. 4, when a load in the axial direction is also applied to the rolling bearing 7 in addition to a load in the radial direction, the contact ellipse S is placed axially outwardly (on the first side in the axial direction) from an axial center (the point Q1) of the outer ring raceway groove 12a. In view of this, as described above, the annular groove 32 of the present embodiment has the cylindrical bottom portion 33 in which the groove depth h is maximum in the annular groove 32 and the groove depth h is uniform along the axial direction. That is, the annular groove 32 has the bottom portion 33 that is wide in the axial direction and deep. With this configuration, the contact ellipse S is placed on a side closer to the first side in the axial direction, but such a configuration can be obtained that the virtual line K3 extending in the radial direction from the center s0 of the contact ellipse S intersects with the deepest bottom portion 33 of the annular groove 32. As a result, the outer ring 12 elastically deforms in the annular groove 32, so that the elastic deformation is hardly transmitted to the housing 2, so that it is possible to further increase an effect to restrain the creep of the outer ring 12.

In the configuration illustrated in FIG. 4, on the section of the rolling bearing 7, the bearing specification is set so that the end s1 of the contact ellipse S on the first side in the axial direction is placed on a side closer to the center in the axial direction than an intersecting point R between a shoulder inner peripheral surface 19 of the outer ring 12 on the first side in the axial direction and the outer ring raceway groove 12a. However, as another configuration, the bearing specification may be set so that the end s1 of the contact ellipse S is placed at the same position as the intersecting point R. This makes it possible to prevent shoulder override of the ball 13 in the outer ring 12. The "shoulder override" here means a phenomenon of a contact ellipse moves toward an groove end on the axial direction of a raceway groove in which rollers are provided with the contact point of the rollers on the raceway groove moves toward the groove end and the contact ellipse moves out of the raceway groove, which is caused by a load applied to the bearing in the axial direction. Even in a case where the end s1 of the contact ellipse S is placed at the same position as the intersecting point R, the whole contact ellipse S is placed within the axial range W. In a case where the end s1 of the contact ellipse S is placed at the same position as the intersecting point R, in order that the whole contact ellipse S is placed within the axial range W, it is necessary for the annular groove 32 (at least the groove end E1) to be formed radially outwardly from the intersecting point R. That is, the annular groove 32 having a groove width larger than the outer ring raceway groove 12a in the axial direction should be formed on the fitting surface 22.

When a load in the radial direction is applied to the rolling bearing 7, the cylindrical surfaces 36a, 37a make contact with the housing 2 via the black oxide film 20, so that a contact pressure is caused therebetween. In a case where the cylindrical surfaces 36a, 37a parallel to the housing inner peripheral surface 3 are narrow, a contact surface pressure caused in the housing 2 increases. In view of this, it is preferable that the cylindrical surfaces 36a, 37a, be wide in the axial direction. When the contact surface pressure applied to the housing 2 is decreased, even if some creep occurs, it is possible to restrain abrasion of the housing 2 in cooperation with the function of the black oxide film 20. Particularly, in the present embodiment, the outer ring 12 is made of bearing steel, whereas the housing 2 is made of aluminum alloy, and therefore, a part of the housing 2 where the contact pressure is high is easily worn. However, since the black oxide film 20 is formed on the cylindrical surfaces 36a, 37a and the cylindrical surfaces 36a, 37a are made wide, such an abrasion can be prevented.

In view of this, it is preferable that the cylindrical surfaces 36a, 37a be made wider than the inclined portions 34, 35 of the annular groove 32 in the axial direction. More specifically, respective axial dimensions of the cylindrical surfaces 36a, 37a are preferably 1 millimeter or more, for example, further preferably 2 millimeters or more. However, when the axial dimensions of the cylindrical surfaces 36a, 37a are too long, the annular groove 32 is narrowed, so that it is hard to place the contact ellipse S within the axial range W. In view of this, it is preferable that the cylindrical surfaces 36a, 37a be made narrower than half of the bottom portion 33 of the annular groove 32 in the axial direction.

As described above, the annular groove 32 for creep restraint and the cylindrical surfaces 36a, 37a to be brought into contact (line contact) with the housing inner peripheral surface 3 via the black oxide film 20 are provided on the fitting surface 22 of the outer ring 12. However, as illustrated in FIG. 1, in the present embodiment, the axial dimension of the outer ring 12 is not made larger (than an axial dimension of the inner ring 11). That is, the axial dimension of the outer ring 12 is not more than the axial dimension of the inner ring 11, and in the present embodiment, the outer ring 12 and the inner ring 11 have the same axial dimension. When the axial dimension of the outer ring 12 is set to be not more than the axial dimension of the inner ring 11, it is possible to restrain an increase in size of the bearing.

As described above, the rolling bearing 7 configured such that the annular groove 32 is formed on the fitting surface 22 of the outer ring 12 is a configuration made by focusing on a contact mode of the ball 13 to the outer ring 12 where the first creep may occur. That is, the outer ring raceway groove 12a with which the ball 13 makes rolling contact is formed on the inner peripheral surface of the outer ring 12 on the opposite side from the fitting surface 22. The whole contact ellipse S formed when the ball 13 makes contact with the outer ring raceway groove 12a is positioned within the axial range W in the outer ring 12 where the annular groove 32 is formed.

Others

Figure 7:
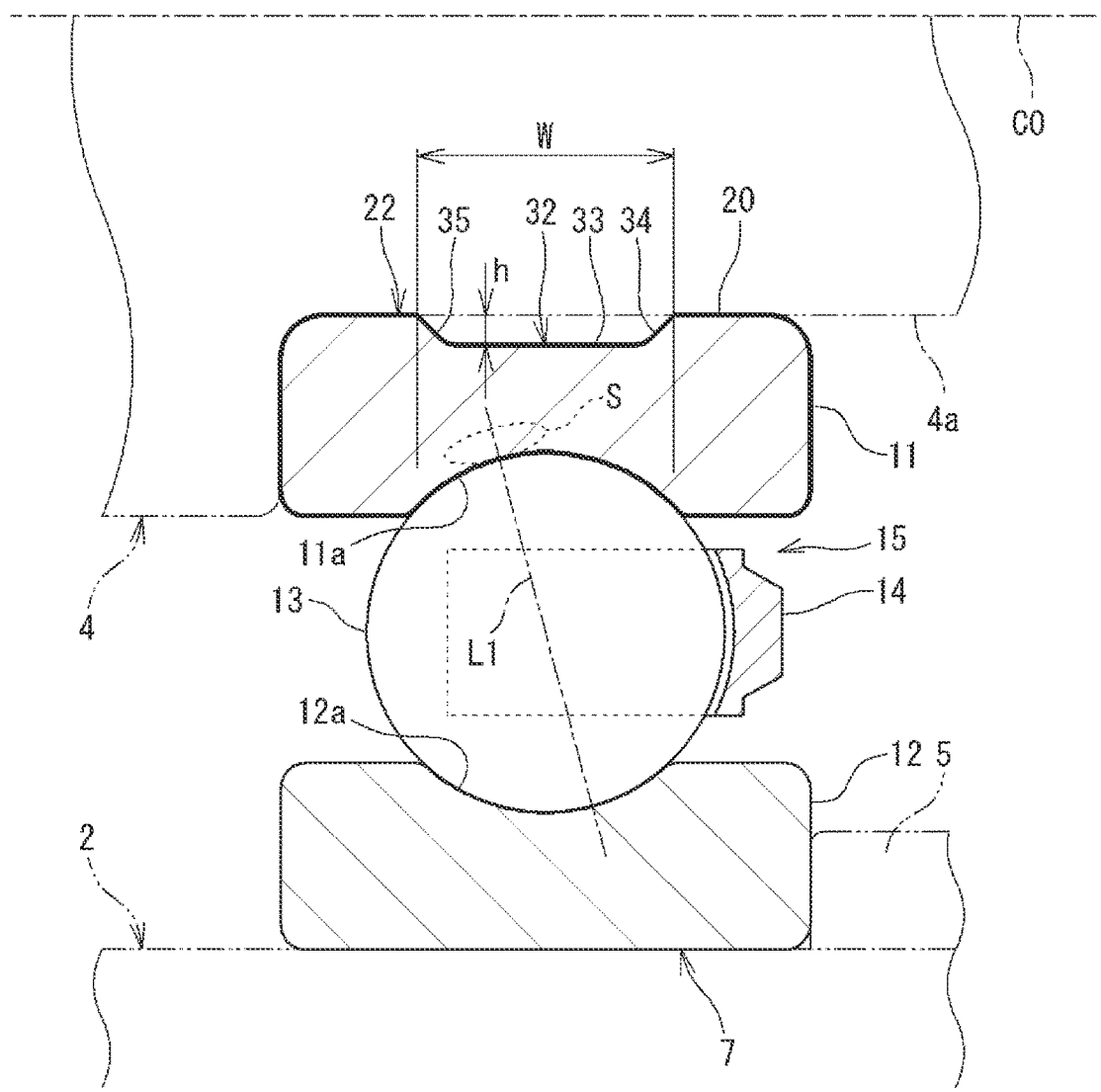
FIG. 7 is a sectional view illustrating a rolling bearing of another embodiment.

In the embodiment, the inner ring 11 is a rotating ring rotating in an integrated manner with a counterpart member (the rotating shaft 4) to which the inner ring 11 is attached and the outer ring 12 is a firm ring fixed to a counterpart member (the housing 2) to which the outer ring 12 is attached (although creep occurs). However, in the disclosure, one of the inner ring 11 and the outer ring 12 may be a rotating ring and the other one of them may be a firm ring. Differently from the configuration illustrated in FIG. 1, the inner ring 11 attached to the shaft 4 may be a firm ring and the outer ring 12 may be a rotating ring rotating in an integrated manner with the housing 2, as illustrated in FIG. 7. In this case, the inner ring 11 and the shaft 4 are assembled in a clearance fit state, so that creep of the inner ring 11 occurs over the shaft 4. Accordingly, the black oxide film 20 is formed on either one or both of the fitting surface (inner peripheral surface) 22 of the inner ring 11 to the shaft 4 as a counterpart member and a side face, of the inner ring 11, that makes contact with the shaft 4 (similarly to the configuration in FIG. 1). Further, the annular groove 32 for creep restraint is formed on the fitting surface 22.

The inner ring raceway groove 11a with which the ball 13 makes rolling contact is formed on an outer peripheral surface of the inner ring 11 on the opposite side from the fitting surface 22. The whole contact ellipse S formed when the ball 13 makes contact with the inner ring raceway groove 11a is positioned within the axial range W in the inner ring 11 where the annular groove 32 is formed. On this account, the inner ring 11 elastically deforms in the annular groove 32, so that the elastic deformation is hardly transmitted to the shaft 4 as a counterpart member, so that it is possible to further increase an effect to restrain the first creep of the inner ring 11. Further, the black oxide film 20 having the mesh-shaped crack 55 (see FIG. 2) formed on its surface is provided on either one or both of the fitting surface 22 of the inner ring 11 and the side face of the inner ring 11, thereby making it possible to restrain the second creep. The configurations of the annular groove 32 and the black oxide film 20 as described in the configuration illustrated in FIG. 1 are applicable to the annular groove 32 and the black oxide film 20 illustrated in FIG. 7.

The embodiment described herein is just an example in all respects and is not limitative. That is, the rolling bearing of the disclosure is not limited to the configuration illustrated in the drawings, but may have other configurations within the scope of the disclosure. For example, the shape (sectional shape) of the annular groove 32 may be a shape other than the shapes illustrated herein. Further, the rolling bearing may be an angular contact ball bearing other than the deep groove ball bearing. Further, the rolling bearing of the disclosure is applicable to various rotating machines and is particularly suitable for a rotating machine having a problem with creep. Note that the rolling bearing of the disclosure may be the rolling bearing 7 that can restrain the second creep even if the first creep cannot be restrained. In this case, as illustrated in FIG. 6, the black oxide film 20 having the mesh-shaped crack 55 formed on the surface 21 as illustrated in FIG. 2 is formed on the fitting surface 22, but the annular groove 32 is omitted. Further, the rolling element may be a roller (a cylindrical roller, a tapered roller) other than the ball.

What is claimed is:
1. A rolling bearing comprising:
an inner ring;
an outer ring; and
a plurality of rolling elements provided between the inner ring and the outer ring, wherein:
one of the inner ring and the outer ring is a rotating ring;

the other one of the inner ring and the outer ring is a firm ring;
the firm ring is attached to a prescribed member; and
a black oxide film having a mesh-shaped crack is formed on at least one surface of a fitting surface of the firm ring and a side face of the firm ring, the fitting surface facing the prescribed member in a radial direction of the rolling bearing, the side face making contact with the prescribed member in an axial direction of the rolling bearing.

2. The rolling bearing according to claim 1, wherein an occupancy of microgrooves on a surface where the black oxide film is formed is equal to or larger than 5% and equal to or smaller than 20%, the occupancy being a ratio of an area of the microgrooves formed on the black oxide film and constituting the cracks with respect to an area of the surface.

3. The rolling bearing according to claim 1, wherein a film thickness of the black oxide film is larger than 1 micrometer and equal to or smaller than 3 micrometers.

4. The rolling bearing according to claim 1, wherein:
the fitting surface has an annular groove; and
the annular groove has a depth at which a bottom portion of the annular groove does not make contact with the prescribed member when a load, which is equal to or smaller than a prescribed value, in the radial direction is applied.

5. The rolling bearing according to claim 4, wherein:
each of the rolling elements is a ball;
a peripheral surface on an opposite side of the firm ring from the fitting surface has a raceway groove with which the ball makes rolling contact; and
a contact surface formed when the ball makes contact with the raceway groove is entirely positioned within a range in which the annular groove is formed, the range being a range in the axial direction of the firm ring.

6. The rolling bearing according to claim 5, wherein:
a load in the radial direction of the rolling bearing and a load in the axial direction of the rolling bearing are applied to the rolling bearing;
the contact surface has an elliptical shape; and
a virtual line extending in the radial direction from a center of the contact surface intersects with the bottom portion of the annular groove, the bottom portion being a deepest part of the annular groove.

7. The rolling bearing according to claim 6, wherein:
the annular groove has the bottom portion and inclined portions;
the bottom portion has a maximum depth in the annular groove and has a cylindrical shape in which the depth is uniform along the axial direction; and
the inclined portions are placed on opposite sides of the bottom portion in the axial direction and are configured to shallow the depth of the annular groove toward opposite ends of the annular groove in the axial direction of the rolling bearing.

8. The rolling bearing according to claim 1, wherein:
the rotating ring is attached to a rotating member that rotates such that the rotating ring rotates in an integrated manner with the rotating member;
the prescribed member to which the firm ring is attached does not rotate.

9. A rotating device comprising:
a first member;
a second member; and
a rolling bearing including:
    an inner ring;
    an outer ring; and
    a plurality of rolling elements provided between the inner ring and the outer ring, wherein:
one of the inner ring and the outer ring is a rotating ring;
the other one of the inner ring and the outer ring is a firm ring;
the rotating ring is attached to the first member;
the firm ring is attached to the second member; and
a black oxide film having a mesh-shaped crack is formed on at least one surface of a fitting surface of the firm ring and a side face of the firm ring, the fitting surface facing the second member in a radial direction of the rolling bearing, the side face making contact with the second member in an axial direction of the rolling bearing.

10. The rotating device according to claim 9, wherein:
the first member rotates such that the rotating ring rotates in an integrated manner with the first member; and
the second member does not rotate.

* * * * *